May 26, 1925.

E. W. HELLER

MOTORIZED PULL TRUCK

Filed July 11, 1923  3 Sheets-Sheet 1

1,539,186

INVENTOR
Edgar W. Heller
BY
ATTORNEYS

May 26, 1925.  
E. W. HELLER  
MOTORIZED PULL TRUCK  
Filed July 11, 1923   3 Sheets-Sheet 2

INVENTOR  
Edgar W. Heller  
BY  
ATTORNEYS

Patented May 26, 1925.

1,539,186

UNITED STATES PATENT OFFICE.

EDGAR W. HELLER, OF NEWARK, NEW JERSEY.

MOTORIZED PULL TRUCK.

Application filed July 11, 1923. Serial No. 650,309.

*To all whom it may concern:*

Be it known that I, EDGAR W. HELLER, a citizen of the United States, and resident of the city of Newark, in the county of Essex and State of New Jersey, have invented certain new and useful Improvements in Motorized Pull Trucks, of which the following is a specification.

The invention, broadly, lies in the conception of the idea of providing a wheeled vehicle such as a factory truck with a motor and with a pull-and-push and steering element, the said element being connected to mechanism on the vehicle in such manner that the application of the power of the motor to the vehicle is controlled by the manipulation of the pull-and-push and steering element, the mechanism being so designed that the motor will be caused to exert its power on the vehicle to drive it in the direction of the thrust of the pull-and-push element. The power necessary to connect the motor to the truck must be comparatively slight so that the mechanism may be comfortably manipulated, that is to say without undue strain, by the operator; and the motor must be so connected to the driving and transporting wheels of the vehicle that the maximum speed of the vehicle will not exceed a comfortable walking speed of the operator. The invention further consists broadly in providing an automatically operating brake mechanism to be controlled by the pull-and-push element in such manner that a thrust on the said element, either forward or rearward, will release the brake and a release of the said element will result in an immediate application of the brakes and a removal of the power of the motor from the vehicle so that the motor shall become ineffective to drive the vehicle when the brake is applied.

The purpose of the invention is to provide a motorized factory truck which may be handled in precisely the same manner as an ordinary factory or warehouse truck having a pull-and-push and steering handle or tongue. A truck constructed in accordance with this invention is provided with a handle, and suitable mechanism is connected to the handle whereby a certain pull maintained on the handle will connect a motor to the truck to drive it forward, and a certain push maintained on the handle will reverse the direction of the drive in order to move the truck rearwardly. The handle is connected to the steering wheel in such manner that it may be swung laterally, both in pushing and pulling, in order to steer the truck. The motor driving mechanism is so geared to the truck that the maximum driving speed will not exceed the comfortable walking speed of the operator.

Another important object of the invention is to provide means whereby if the certain minimum power, either in pushing or pulling, is not maintained on the handle, or if the truck should run up on the operator the speed of the truck will be automatically reduced, and if the handle is released, or the operator ceases to exert a power thereon, the motor will be disconnected from the truck driving means and a brake will be automatically applied.

There are other important objects and advantages of the invention which will be obvious to those skilled in the art, and it is thought to be unnecessary to state them herein.

Referring to the various parts by numerals, 1 designates the body of the truck. As shown in the drawings, this body consists merely of a platform, but of course, it may be of any construction. Supported in suitable bearings at the rear of the truck is a drive axle 2 which carries suitable transporting wheels 3. On the drive axle is mounted a suitable differential gear 4 over which runs a drive chain 5.

Near the forward end of the truck is mounted a motor 6. This motor is shown in the drawings as an ordinary gasoline engine, but, of course, it may be a motor of any suitable form. As shown in the drawings the motor is supported by a pair of hangers 9, the upper ends of which are secured to the under side of the truck body. It will, of course, be understood that the motor may be supported in any suitable manner. A starting crank 7 is connected to the motor but any suitable form of starting device may be used. The main engine shaft 8 extends rearwardly from the engine and is mounted in suitable bearings supported in the hangers 9 carried by the truck body. On the engine shaft is mounted the usual fly wheel 10. The engine shaft between the hangers 9 is square, or rectangular, in cross section and sliding thereon are two friction driving pinions 11 and 12. These pinions are engaged by depending forks 13 and 14 which are rigidly connected to a sliding bar 15, said bar being supported in and sliding through suitable bearings mounted in the hangers 9. The friction driving pinions 11 and 12 are spaced apart and are adapted to engage the main friction disk 16 at diametrically opposite points. The friction driving pinions are separated from each other a distance somewhat greater than the diameter of the main friction disk 16 so that when said driving pinions are in their central or neutral positions both of them will be disengaged from the disk 16 and it will be necessary to move the bar 15 forwardly or rearwardly in order to bring one or the other of said driving pinions into engagement with the friction disk 16. The friction disk 16 is mounted on a shaft 17 which extends transversely of the truck and is at right angles to the engine drive shaft so that the driving pinions 11 and 12 are adapted to be brought into engagement with the vertical face of the friction disk 16.

Figure 1:
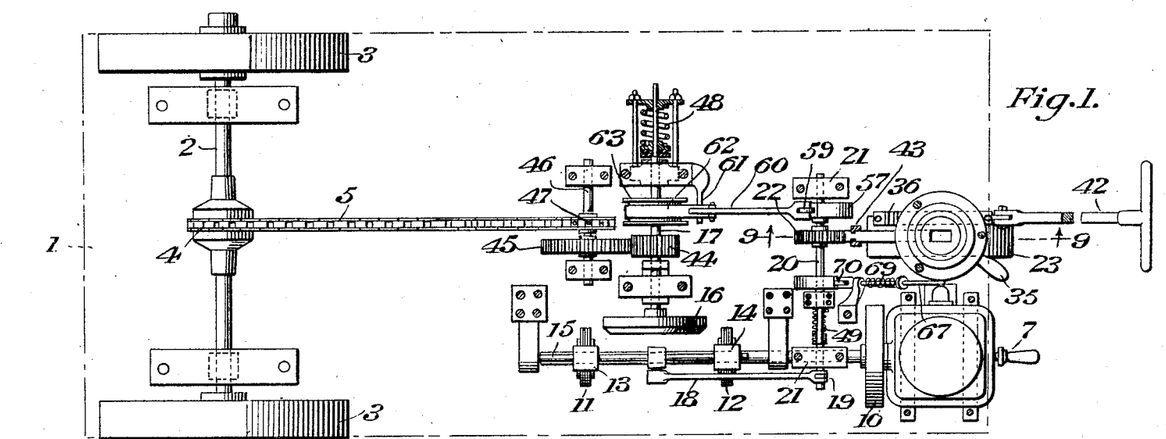
Fig. 1 is a plan view of the mechanism of the truck, the body of the truck being removed.
Figure 2:
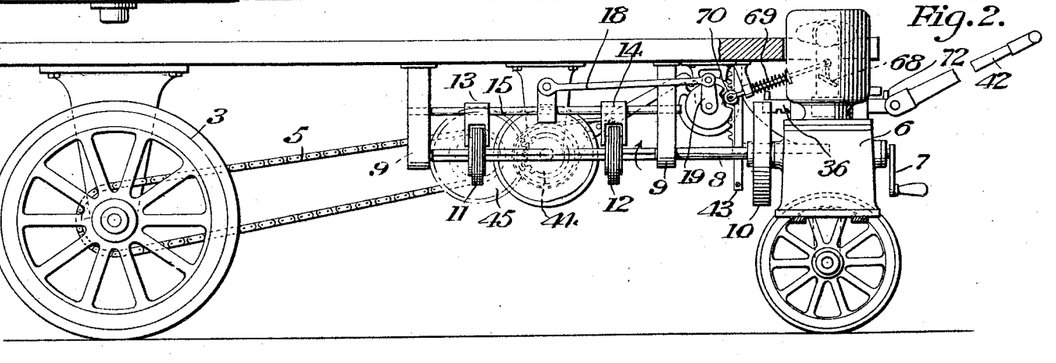
Fig. 2 a side elevation of the truck.
Figure 3:
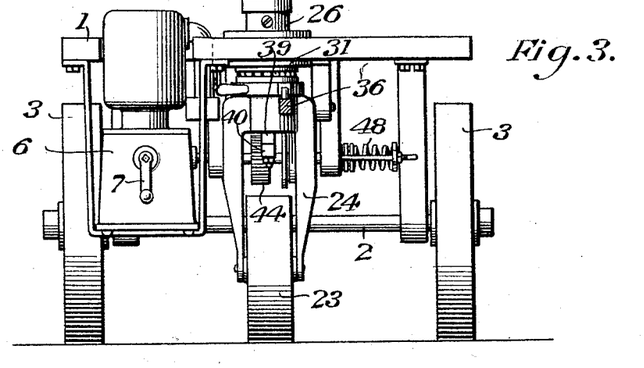
Fig. 3 a front elevation of the truck.

The bar 15 is shifted forwardly and rearwardly in its bearings by means of a link 18 which is connected at its rear end to the slidable bar 15, its forward end being connected to a crank 19 mounted on the end of a transversely extending rocking controller bar 20. The controller bar is mounted in bearings 21 depending from the truck body and carries a pinion or curved rack 22. In the normal position of the controller bar the crank arm 19 extends upward vertically, as illustrated in Fig. 2 and this normal vertical position of said crank places the driving pinions 11 and 12 in such positions that the friction disk 16 is between them and out of engagement therewith. This is the normal and non-driving position of the apparatus. The steering wheel 23 is mounted in the lower end of a fork 24, and the upper end of said fork is integral with a rotatable sleeve 25 which extends upwardly through a bearing sleeve 26 rigidly mounted in the truck body. The sleeve 26 is provided with a flange 27 at its lower end through which pass securing bolts 28, said bolts locking the sleeve to the truck body. On the upper end of the sleeve 26 is secured a collar 29, said collar serving to lock the sleeve in the bearing. The sleeve 26 is provided with an annular shoulder which supports a circular bearing plate 30 and between said bearing plate and the flange 27 of the sleeve 26 are arranged anti-friction bearing balls 31. The sleeve 26 is also provided with an annular shoulder to support a rotatable stop plate 32, said stop plate being arranged directly below the bearing plate 30 and carrying suitably spaced stop lugs 33 and 34. The stop plate may be rotated, as hereinafter described, by means of a handle 35 connected directly thereto and extending forwardly therefrom, said handle being in a convenient position for manipulation by the operator of the truck.

Figures 9, 10:
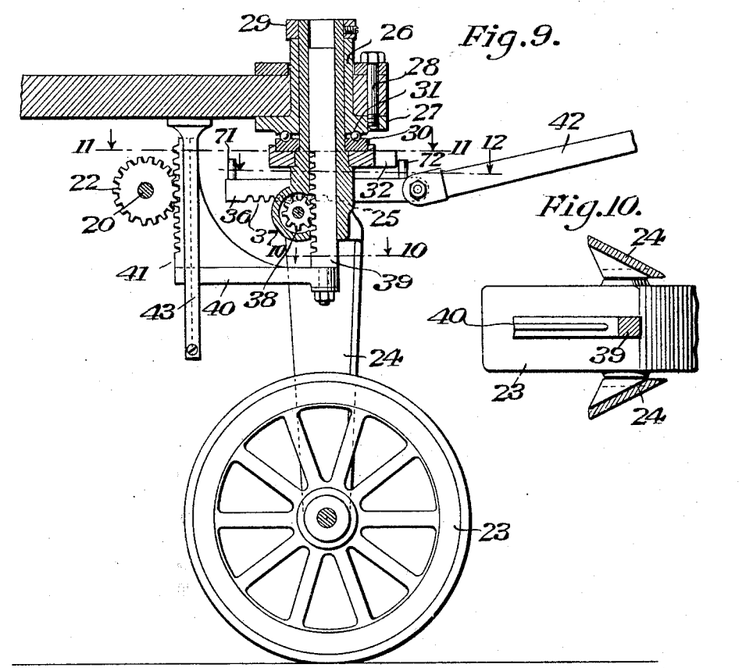
Fig. 9 a detail vertical sectional view taken on the line 9—9 of Fig. 1.
Fig. 10 a detail horizontal sectional view taken on the line 10—10 of Fig. 9.

A pull-and-push element 36 slides forwardly and rearwardly through an aperture formed in the body of the sleeve 26. The lower edge of this pull-and-push element is provided with a rack 37 which meshes with a broad faced pinion 38 mounted in the sleeve body. The pinion 38 engages a vertical rack 39 which is adapted to move up and down within the sleeve 26. The rack of the pull-and-push element engages the top of the pinion 38 so that a forward movement of the element will result in a downward movement of the rack 39, and a rearward movement of the element 36 will result in an upward movement of the said rack 39. The lower end of the rack 39 carries a rearwardly extending horizontal arm 40, said arm being connected to the rack 39 by any suitable form of swivel joint so that the rack may rotate without swinging the arm 40. The members of the fork 24 are flared rearwardly to permit said fork to be rotated sufficiently for steering purposes without contact with the arms 40. (See Fig. 10.) The rear end of the arm 40 carries an upwardly extending rack 41 which engages the curved rack 22. It is manifest therefore that a forward or rearward movement of the pull-and-push element 36 will result in a corresponding downward or upward movement of the rack 41. The movement of the rack 41 will be transmitted to the controller bar 20 through the curved rack 22. Connected to the forward end of the bar 36 is a handle 42 by means of which the truck may be pulled or pushed rearwardly, and steered. The handle and the pull-and-push rack 36 may be swung laterally in either direction in order to turn the steering wheel. The lateral movement of the handle will result in the turning of the sleeve 26 and all the parts carried thereby. The swivel connection between the arm 40 and the rack 39 will permit the sleeve and the parts carried thereby to turn in either direction without disturbing the connection between the rack 41 and the controller bar.

Figure 4:
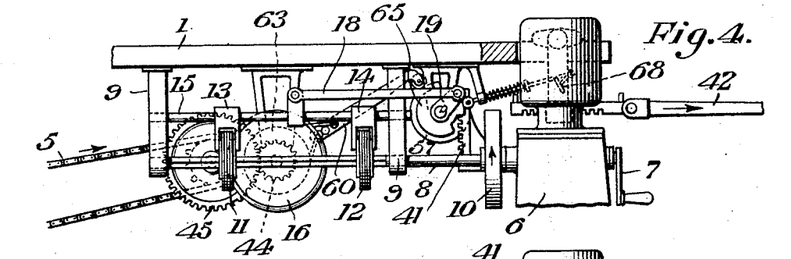
Fig. 4 a side elevation of the front portion of the truck showing the parts in the position for driving the truck forward in low gear.
Figures 5, 6, 7, 8:
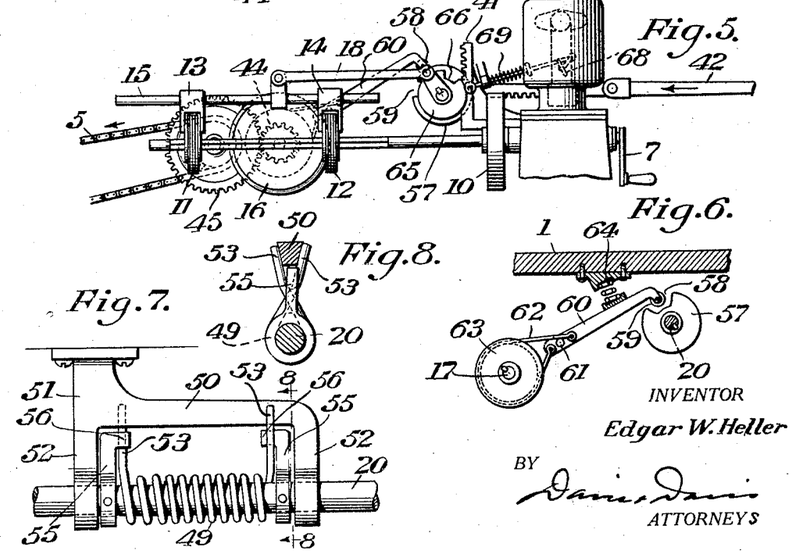
Fig. 5 a view similar to Fig. 4 showing the parts in the position for driving the truck rearward.
Fig. 6 a detail side elevation of the brake device.
Fig. 7 a detail side elevation of the means for automatically reducing the speed of the truck and disconnecting the motor from the truck driving means.
Fig. 8 a detail cross sectional view taken on the line 8—8 of Fig. 7.

A forward pull on the handle 42 will result in a downward movement of the rack 41. This will swing the crank arm 19 forwardly and bring the driving pinion 11 into engagement with the friction disk 16, (see Fig. 4) and through suitable driving mechanism, as described hereinafter, the truck will be driven forward. A rearward movement of the bar 36 will result in an upward movement of the rack 41 and a rearward movement of the crank 19. This will bring the driving pinion 12 into engagement with the friction disk 16, (see Fig. 5) and result in a rearward movement of the truck. The rack 41 slides vertically in rigid guides 43 depending from the bottom of the truck body.

The shaft 17 is provided with a pinion 44 which meshes with a gear 45 mounted on a short transverse shaft 46. Shaft 46 carries a chain wheel 47 which is engaged by the drive chain 5. The shaft 17 is mounted to have a slight sliding movement in its bearings and is pressed toward the friction driving pinions by a spring 48. The friction disk is slightly beveled around the margin of its operating face to facilitate the engagement therewith of the driving pinions. As the driving pinions are brought into engagement with the disk 16, the said disk and its shaft 17 are moved laterally against the tension of the spring 48. This ensures a strong frictional engagement between the engaged driving pinions and the friction disk.

The controller bar 20 is held in its normal position by means of a strong spring 49 which is coiled about said bar with its ends 53 extending upwardly from opposite sides thereof. These upwardly extending ends are crossed and extend upwardly beyond the stop bar 50 of a bracket 51 secured to the bottom of the truck body. The bracket 51 is provided with depending ends 52 which form bearings for the bar 20 and through which said bar loosely extends. Secured rigidly to the controller bar 20 adjacent each end of the spring 49 is a crank arm 55, each arm being provided with an inwardly extending lug 56 which engages the adjacent end 53 of the spring. The crank arms 55 engage the spring ends 53 on opposite sides so that when the controller bar is rocked in one direction one crank arm will move the engaged end against the tension of the spring 49 while the other crank arm has an idle movement. When the controller bar is released the spring 49 will return to its normal position and move the displaced crank arms 55 back to their normal positions. It is manifest that the thrust on the pull-and-push element must be sufficient to rotate the controller bar 20 against the tension of the spring 49 before the motor can be connected to the truck driving mechanism. It is also clear that the spring 49 must be of sufficient strength to disconnect the driving pinions 11 and 12 from the friction disk 16. Any suitable form of yielding means, for restoring the controller bar to its normal position and thereby placing the driving pinions in their neutral or non-driving position, may be employed.

A brake releasing cam 57 is rigidly mounted on the controller bar 20. This cam is provided with a recess or cut out 58 in which normally rests a roller 59 mounted on the end of a brake lever 60, said lever being pivoted at 61. Connected to this brake lever at diametrically opposite points on opposite sides of the center of the pivot is a brake band 62, said band engaging a brake wheel 63 mounted on shaft 17. The ends of the brake band are so connected to the brake lever that when the roller 59 is in the recess 58 the brake will be applied. When however, the cam 57 is rotated sufficiently to cause the roller 59 to ride up out of the recess and on to the periphery of the cam the brake band will be expanded and released. The recess 58 is comparatively short and the end walls thereof form cams which are adapted to throw the brake lever outwardly away from the cam when said cam is rocked or rotated in either direction. It is manifest therefore that the brake band will be released by a rocking movement of the controller bar in either direction. The pinions 11 and 12 are so positioned with respect to the friction disk 16 that the brake releasing cam 57 will operate to release the brake before either of said pinions is brought into contact with the friction disk. To normally and yieldingly hold the brake lever in brake applying position a spring 64 is provided, said spring being arranged to press said lever into brake applying position and to force the roller 59 into the recess 58 when the cam 57 is in its normal position.

The controller bar 20 carries an engine controlling cam 65 similar in construction to the brake release cam 57. This engine controlling cam is provided with a recess or cut out 66. A throttle controlling rod 67 is connected to the engine throttle 68. The rod 67 is mounted to slide in bearings and carries at its end a roller 70 which normally lies in the recess 66. A spring 69 is connected to the throttle rod and yieldingly holds the roller 70 mounted at the end of said rod, in the recess 66. When the controller bar is rocked in either direction the controlling cam will force the throttle rod forwardly against the tension of the spring 69 and open the engine throttle. When the controller bar returns to its normal position the spring 69 causes the throttle rod to move, carrying the roller 70 into the recess in the controlling cam, thereby partly closing or restricting the throttle. The engine may be provided with any suitable form of constant speed governor (not shown).

Figure 11:
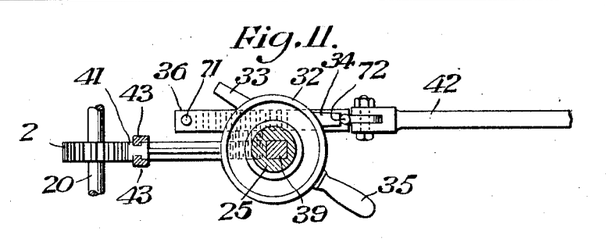
Fig. 11 a detail horizontal sectional view taken on the line 11—11 of Fig. 9.
Figure 12:
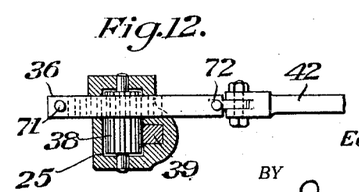
Fig. 12 a detail horizontal sectional view taken on the line 12—12 of Fig. 9.

The pull-and-push rack 36 is provided at its ends with upwardly extending stop pins 71 and 72 which are adapted to engage the stop lugs 33 and 34 on the stop plate 32. When it is desired to move the truck forward the stop plate 32 is adjusted, by means of the handle 35, to the position shown in Fig. 11. In this position the stop lug 34 is placed in the path of the stop pin 72 and prevents material rearward movement of the pull-and-push rack. When it is desired to move the truck rearwardly the stop plate is rotated to bring the stop lug 33 into the path of the stop pin 71 and to take the stop lug 34 out of the path of the stop pin 72. The pull-and-push rack is then free to move rearwardly but its forward movement will be limited by the stop lug 33. The stop plate 32 with the lugs 33 and 34 are not essential. They are only to prevent a sudden reversal of the thrust on the handle throwing the truck into reverse and stalling the engine.

The thrust on the pull-and-push element must be sufficient to overcome the tension of the spring 49 before the motor will actuate the driving mechanism. The operator is never entirely relieved of work. He must always exert a predetermined thrust, varying in amount from a minimum for the displacement of spring 49 enough to ease the brake, to the maximum where the crank 19 has been revolved past the horizontal, thereby bringing the pinion 11 again near the periphery of the friction disk 16. Any power exerted beyond this does not affect the mechanism but simply helps to move the truck. To move the truck a certain thrust between these extremities must be exerted. Whether the truck be loaded or light the operator has the same amount of work to do. The driving pinions will first engage the friction disk at its periphery so that the truck will start at slow speed. If the engine, due to lack of power, is unable to drive the truck at the desired normal speed, the operator will pull on the pull element and gradually move the forward-driving pinion toward the center of the friction disk. This movement of the pinion will increase the effective power of the engine and the truck will be moved at a slower speed. It is obvious that the operator may assist the engine in moving the truck up grade and out of difficult places by pulling on the handle and thereby adding his power to the power of the engine and at the same time increasing the effective power of the engine by reducing the speed of the truck. The truck will start at a slow speed, and the speed will be gradually increased if the operator continues to pull on the pull-and-push element. If when the truck is under way the operator should ease up on the handle and thereby permit the driving pinion to be moved outward toward the periphery of the friction disk the speed of the truck will be decreased.

From the foregoing it is manifest that I provide an ordinary hand truck adapted to be pulled and moved by a steering handle. The operator will be relieved of a part of the work of moving the truck but he must still pull on the steering handle in order to keep the truck moving. After he exerts a predetermined maximum pull the additional power necessary to move the vehicle is supplied by a suitable motor mounted on the truck. However, the operator is never relieved of the necessity of exerting a predetermined amount of power on the handle. A truck constructed in accordance with this invention might be termed a follow-up truck.

What I claim is:

1. A motorized pull truck comprising a truck body, transporting wheels, a motor, a pull element adapted for drawing the truck, and means operated by the pull element to connect the motor to the transporting wheels.

2. A motorized pull truck comprising a truck body, transporting wheels, a motor carried by the truck, driving mechanism connected to the transporting wheels, a pull element connected to the truck and adapted for drawing it, and means operated by a forward pull on said pull element to connect the motor to the driving mechanism.

3. A motorized pull truck comprising a truck body, transporting wheels, a motor carried by the truck body, a handle at the forward end of the truck and adapted for drawing it, and means operated by a forward pull on said handle to connect the motor to the transporting wheels.

4. A motorized pull truck comprising a truck body, transporting wheels therefor, a driving mechanism connected to said wheels, a motor carried by the truck and normally disconnected from the driving mechanism, a pull element connected to the truck and adapted for drawing it, and means operated by a forward pull on said element to connect the motor to the driving mechanism.

5. A motorized pull truck comprising a truck body, transporting wheels, a motor, a push element adapted for manually moving the truck, and means operated by the push element to connect the motor to the transporting wheels.

6. A motorized pull truck comprising a truck body, transporting wheels, a motor carried by the truck, driving mechanism connected to the transporting wheels, a push element connected to the truck and adapted for manually moving it, and means operated by a rearward push on said element to connect the motor to the driving mechanism.

7. A motorized pull truck comprising a truck body, transporting wheels, a motor carried by the truck body, a handle connected to the forward end of the truck and adapted for manually moving it, and means operated by a rearward push on said handle to connect the motor to the transporting wheels.

8. A motorized pull truck comprising a truck, transporting wheels therefor, driving mechanism connected to said wheels, a motor carried by the truck and normally disconnected from the driving mechanism, a push element connected to the truck and adapted for manually moving it, and means operated by a rearward push on said element to connect the motor to the driving mechanism.

9. A motorized pull truck comprising a truck, transporting wheels, a motor carried by the truck, a push element connected to the truck and adapted for manually moving it, and means whereby a rearward push on said element will cause the motor to drive the truck rearward.

10. A motorized pull truck comprising a truck body, transporting wheels, a motor, a movable pull-and-push element connected to the truck and adapted for drawing and pushing it, and means whereby a thrust on said pull-and-push element will cause the motor to drive the truck in the direction of the movement of the pull-and-push element due to said thrust.

11. A motorized pull truck comprising a truck body, transporting wheels, a steering wheel, a motor carried by the truck body, a movable pull-and-push element connected to and adapted to swing the steering wheel, and means whereby a thrust on said pull-and-push element will cause the motor to drive the truck in the direction of movement of the pull-and-push element due to said thrust.

12. A motorized pull truck comprising a truck body, transporting wheels therefor, a driving mechanism connected to said wheels, a motor carried by the truck and normally disconnected from the driving means, a pull-and-push element connected to the truck and adapted for drawing and pushing it, and means whereby a thrust on said pull-and-push element will connect the motor to the driving mechanism to drive the truck in the direction of the thrust on the pull-and-push element.

13. A motorized pull truck comprising a truck body, transporting wheels therefor, a driving mechanism connected to said wheels, a motor carried by the truck and normally disconnected from the driving means, a movable pull-and-push element connected to the truck and adapted for drawing and pushing it, and means whereby a thrust on said pull-and-push element will connect the motor to the driving mechanism to drive the truck in the direction of the movement of the pull-and-push element.

14. A motorized pull truck comprising a truck body, rear transporting wheels, a forward steering wheel, a motor, a pulling and steering element connected to the steering wheel, and means operated by forward pull on said element to connect the motor to the transporting wheels.

15. A motorized pull truck comprising a truck body, transporting wheels, a steering wheel, a motor carried by the truck, driving mechanism connected to the transporting wheels, a pulling and steering element connected to the steering wheel, and means operated by a forward pull on said element to connect the motor to the driving mechanism.

16. A motorized pull truck comprising a truck body, transporting wheels, a steering wheel, a motor carried by the truck body, a pulling and steering handle connected to the steering wheel, and means operated by a forward pull on said handle to connect the motor to the transporting wheels.

17. A motorized pull truck comprising a truck, transporting wheels therefor, a steering wheel, a driving mechanism connected to the transporting wheels, a motor carried by the truck and normally disconnected from the driving mechanism, a pulling and steering element connected to the steering wheel, and means operated by a forward pull on said element to connect the motor to the driving mechanism.

18. A motorized pull truck comprising a truck body, rear transporting wheels, a forward steering wheel, a motor, a pushing and steering element connected to the steering wheel, and means operated by rearward push on said element to connect the motor to the transporting wheels.

19. A motorized pull truck comprising a truck body, transporting wheels, a steering wheel, a motor carried by the truck, driving mechanism connected to the transporting wheels, a pushing and steering element connected to the steering wheel, and means operated by a rearward push on said element to connect the motor to the driving mechanism.

20. A motorized pull truck comprising a truck body, transporting wheels, a steering wheel, a motor carried by the truck body, a pushing and steering handle connected to the steering wheel, and means operated by a rearward push on said handle to connect the motor to the transporting wheels.

21. A motorized pull truck comprising a truck, transporting wheels therefor, a steering wheel, a driving mechanism connected to the transporting wheels, a motor carried by the truck and normally disconnected from the driving mechanism, a pushing and steering element connected to the steering wheel, and means operated by a rearward push on said element to connect the motor to the driving mechanism.

22. A motorized pull truck comprising a truck, transporting wheels, a steering wheel, a motor carried by the truck, a laterally swinging and rearwardly movable pushing and steering element connected to the steering wheel, and means whereby a rearward push on said element will cause the motor to drive the truck rearward.

23. A motorized pull truck comprising a truck body, transporting wheels therefor, a driving mechanism connected to said wheels, a motor carried by the truck and normally disconnected from the driving means, a pull-and-push and steering element connected to the truck and adapted for drawing and pushing it, and means whereby a thrust on said pull-and-push element will connect the motor to the driving mechanism to drive the truck in the direction of the thrust on the pull-and-push element.

24. A motorized pull truck comprising a truck body, transporting wheels therefor, a driving mechanism connected to said wheels, a motor carried by the truck and normally disconnected from the driving means, a movable pull-and-push and steering element connected to the truck and adapted for drawing and pushing it, and means whereby a thrust on said pull-and-push element will connect the motor to the driving mechanism to drive the truck in the direction of the movement of the pull-and-push element.

25. A motorized pull truck comprising a truck body, transporting wheels, a motor carried by the truck body, a normally applied brake, a pull element connected to the truck and adapted for manually drawing it, means operated by a forward pull on the pull element to cause the motor to drive the truck forward, and means operated by said forward pull on the pull element to release the normally applied brake.

26. A motorized pull truck comprising a truck body, transporting wheels, a motor carried by the truck body, a normally applied brake, a push element connected to the truck and adapted for manually moving it, means operated by a rearward push on the push element to cause the motor to drive the truck rearward, and means operated by said rearward push on the push element to release the normally applied brake.

27. A motorized pull truck comprising a truck body, transporting wheels, a gasoline motor carried by the truck body, a normally restricted throttle, a normally applied brake, a pull element connected to the truck, means operated by a forward pull on the pull element to cause the motor to drive the truck forward, means operated by said forward pull on the pull element to release the normally applied brake, and means operated by the said forward pull to open the throttle.

28. A motorized pull truck comprising a truck body, transporting wheels, a gasoline motor carried by the truck body, a normally restricted throttle, a normally applied brake, a push element connected to the truck, means operated by a rearward push on the push element to cause the motor to drive the truck rearward, means operated by said rearward push on the push element to release the normally applied brake, and means operated by the said rearward push to open the throttle.

29. A motorized pull truck comprising a truck body, transporting wheels, a motor carried by the truck body, a normally applied brake, a pull element connected to the truck and adapted for drawing it, means operated by a forward pull on the pull element to cause the motor to drive the truck forward, means operated by said forward pull on the pull element to release the normally applied brake, and means for automatically restoring the brake to applied position upon the release of the pull element.

30. A motorized pull truck comprising a truck body, transporting wheels, a motor carried by the truck body, a normally applied brake, a push element connected to the truck and adapted for manually moving it, means operated by a rearward push on the push element to cause the motor to drive the truck rearward, means operated by said rearward push on the push element to release the normally applied brake, and means for automatically restoring the brake to applied position upon the release of the push element.

31. A motorized pull truck comprising a truck body, transporting wheels, a gasoline motor carried by the truck body, a normally restricted throttle, a normally applied brake, a pull element connected to the truck, means operated by a forward pull on the pull element to cause the motor to drive the truck forward, means operated by said forward pull on the pull element to release the normally applied brake, means operated by the said forward pull to open the throttle, and means for automatically restoring the brake to applied position upon the release of the pull element.

32. A motorized pull truck comprising a truck body, transporting wheels, a gasoline motor carried by the truck body, a normally restricted throttle, a normally applied brake, a push element connected to the truck, means operated by a rearward push on the push element to cause the motor to drive the truck rearward, means operated by said rearward push on the push element to release the normally applied brake, means operated by the said rearward push to open the throttle, and means for automatically restoring the brake to applied position upon the release of the push element.

33. A motorized pull truck comprising a truck body, transporting wheels therefor, a driving mechanism connected to said wheels, a motor carried by the truck and normally disconnected from the driving mechanism, a pull element connected to the truck and adapted for drawing it, means operated by a forward pull on said element to connect the motor to the driving mechanism and means for automatically disconnecting the motor from the driving mechanism upon the release of the pull element.

34. A motorized pull truck comprising a truck body, transporting wheels, a motor carried by the truck body, a handle at the forward end of the truck adapted for drawing it, means operated by a forward pull on said handle to connect the motor to the transporting wheels, and means for automatically disconnecting the motor from the driving mechanism upon the release of the handle.

35. A motorized pull truck comprising a truck body, transporting wheels, a motor carried by the truck body, a pull element connected to the truck and adapted for drawing it, means whereby a forward pull on said element will cause the motor to drive the truck forward, and means for automatically disconnecting the motor from the driving mechanism upon the release of the pull element.

36. A motorized pull truck comprising a truck body, transporting wheels, a motor carried by the truck body, a pull element connected to the truck and adapted for drawing it, means whereby a forward pull on said element will cause the motor to drive the truck forward, means for automatically disconnecting the motor from the driving mechanism upon the release of the pull element, a normally applied brake, and means operated by said forward pull on the pull element to release the normally applied brake.

37. A motorized pull truck comprising a truck body, transporting wheels, a motor carried by the truck body, a movable push element connected to the truck and adapted for manually moving and steering it, and means whereby a rearward push on the said element will cause the motor to drive the truck rearward said means increasing the speed of the truck as the push element is moved rearward.

38. A motorized pull truck comprising a truck body, transporting wheels, a motor carried by the truck body, a normally applied brake, a pull-and-push element connected to the truck, means operated by a thrust on the pull-and-push element to cause the motor to drive the truck in the direction of said thrust, means operated by the movement of the pull-and-push element to release the normally applied brake, and means for automatically restoring the brake to applied position upon the release of the pull-and-push element.

39. A motorized pull truck comprising a truck body, transporting wheels, a motor, a driving mechanism connecting the motor to the transporting wheels, yielding means to hold the motor inactive on the driving mechanism, a pull-and-push element adapted for drawing and pushing the truck and operatively connected to the said yielding means, and means whereby a thrust on said pull-and-push element sufficient to overcome the yielding means will cause the motor to drive the truck in the direction of the thrust on the pull-and-push element.

40. A motorized pull truck comprising a truck body, transporting wheels, a gasoline motor carried by the truck and normally disconnected from the transporting wheels, a normally restricted throttle, a normally applied brake, a pull element connected to the truck and adapted for pulling and steering it, means operated by a forward pull on the pull element to release the normally applied brake, means operated by said forward pull on the pull element to open the throttle, and means operated by said forward pull to connect the motor to the transporting wheels whereby the motor will drive the truck forward.

41. A motorized pull truck comprising a truck body, transporting wheels, a motor carried by the truck and normally disconnected from the transporting wheels, a normally applied brake, a control element connected to the truck and adapted for pulling, pushing and steering it, means operated by either a longitudinal pull or push upon said control element to release the normally applied brake, and means operated by the control element to connect the motor to the transporting wheels whereby the motor will drive the truck either forward or backward as the control element is pulled or pushed.

42. A motorized pull truck comprising a truck body, transporting wheels, a motor carried by the truck and normally disconnected from the transporting wheels, a normally applied brake, a control element connected to the truck and adapted for pulling, pushing and steering it, means operated by either a longitudinal pull or push upon the control element to release the said brake, means operated by the control element to connect the motor to the transporting wheels whereby the motor will drive the truck either forward or backward as the control element is pulled or pushed respectively, means to automatically disconnect the motor from the transporting wheels when the control element is released, and means to automatically apply the brake when the control element is released.

43. A motorized pull truck comprising a truck body, transporting wheels, a motor carried by the truck, a normally applied brake, a control element connected to the truck and adapted for pulling, pushing and steering it, means operated by either a longitudinal pull or push upon the control element to release the said brake, and means operated by the control element to cause the motor to drive the truck in one direction when the control element is pulled and in a reverse direction when the control element is pushed.

44. A motorized pull truck comprising a truck body, transporting wheels, a motor carried by the truck, a normally applied brake, a control element connected to the truck and adapted for pulling, pushing and steering it, means operated by either a longitudinal pull or push upon the control element to release the said brake, means operated by the control element to cause the motor to drive the truck in one direction when the control element is pulled and in a reverse direction when the control element is pushed, means to automatically render the motor ineffective to drive the truck when the control element is released, and means to automatically apply the brake when the control element is released.

In testimony whereof I hereunto affix my signature.

EDGAR W. HELLER.